W ADAMS.
Hand-Plow.
No 21,055.
Patented Aug. 3, 1858.
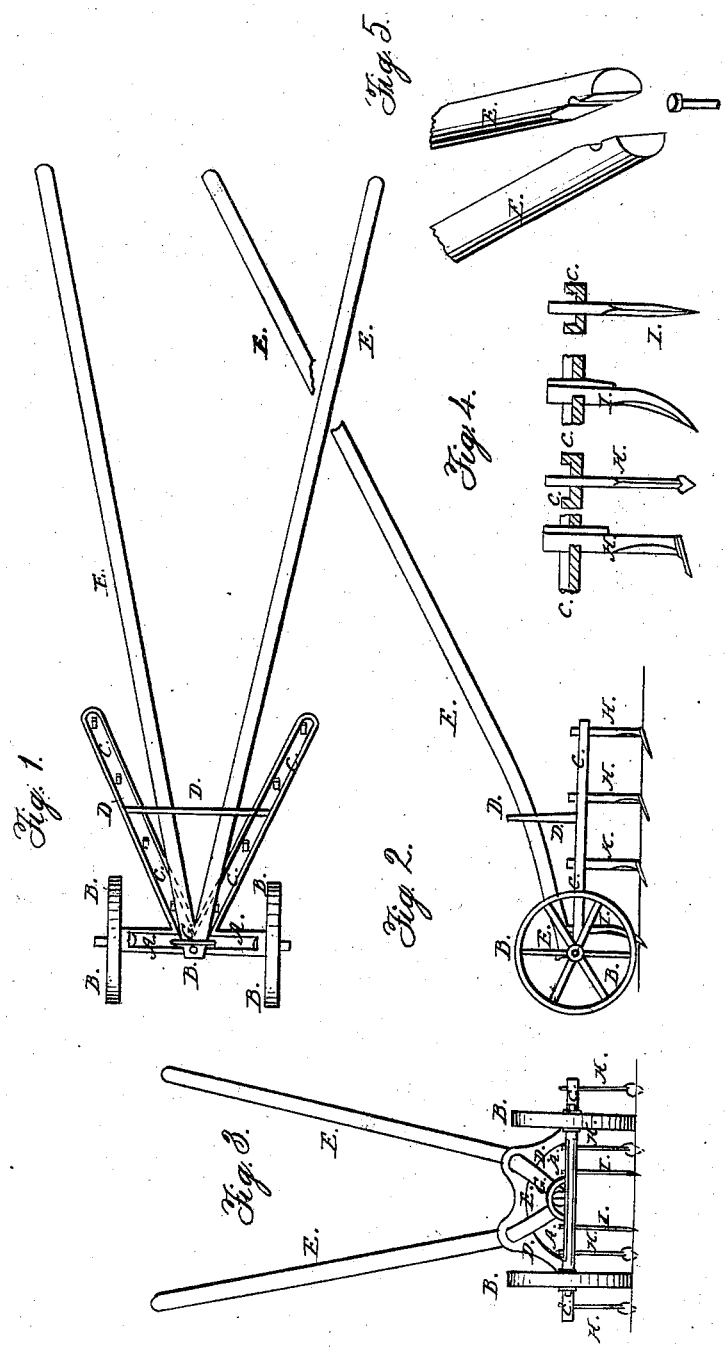

UNITED STATES PATENT OFFICE.

W. ADAMS, OF DETROIT, MICHIGAN.

IMPROVEMENT IN CULTIVATORS.

Specification forming part of Letters Patent No. 21,055, dated August 3, 1858.

*To all whom it may concern:*

Be it known that I, WILLIAM ADAMS, of Detroit, in the county of Wayne and State of Michigan, have invented a new and useful Improvement in Machines for Cultivating Garden Roots and other Crops, and for eradicating weeds, which I call the "Garden-Scarifier;" and I do hereby declare that the following is a full and exact description of the construction and operation of the same, reference being had to the annexed drawings, in which—

Figure 1 represents a plan view of my improved garden-scarifier; Fig. 2, a side, and Fig. 3 a front, elevation of the same. Fig. 4 represents several detail views of the knives and teeth; and Fig. 5 a detailed view of the mode of securing the handles.

My improvement consists in the construction and general arrangement of parts constituting a new and useful implement which I call the "garden or hand scarifier;" also in the peculiar mode of inserting and fastening the handles in the frame.

To enable others skilled in the art to make and use my invention, I will now proceed to describe its construction and operation.

I construct a frame of wood, iron, or other suitable material, consisting of a cross-bar, A, with pivots fixed in its extremities, on which the wheels B revolve when the machine is put in operation. To this cross-bar are cast or otherwise secured the ends of the side bars, C, which are arranged symmetrically in relation to the cross-bar, so as to form an angle the apex of which is on the cross-bar midway between the wheels. The two side bars are united at about half their length by a double-looped yoke, D, extending from one side bar to the other for the double purpose of giving strength to the structure and of affording a support for the handles. The yoke is constructed accordingly of the form of an arch raised transversely above and in a plane perpendicular, or thereabout, to that of the side bars. The handles E are passed through the holes or loops F in the yoke, and their ends are received in another loop, G, on the front part of the frame, where they are firmly secured.

In the sides of the frame are small mortises which receive the teeth H, which teeth are made of spring-steel and flattened at the lower extremity, somewhat in the form of a trowel, and made thin and sharp, so as to cut off the roots of weeds. These sharp blades are turned up at the bottom, so that this trowel-shaped part may run horizontally in the ground from half an inch in depth to any desirable depth below the surface, and their operation, from their shape and arrangement, is to cut off the root of every weed in passing, and leaving the surface of the ground undisturbed, except that which is loosened and pulverized. In front of these trowel-shaped teeth are two upright knives, I, or teeth with an edge in front and without the usual horizontal cutting part at the bottom, their object being to prevent the other teeth from disturbing the plants. The machine may also be used to run in the space between the rows by taking out said knife-like teeth and substituting those of the same form as the others, in which case the said knife-like teeth may be inserted in the after part of the side bars, if desirable, to prevent the machine from disturbing the plants.

The teeth and knives are attached to upright shanks, which are provided with a recess either in front or in the rear part. This recess or notch is made of a width to correspond with the thickness of the side bars, so that when a wedge be driven into the mortise on the side of the shank opposite to that where the recess is the bottom of the recess in the shank is brought to bear against the side of the mortise, whereby the tooth is securely fixed and not liable of being moved either up or downward.

The handles are joined and attached to the frame by means of a pin that is entered in front of the loop and between the two handles. In Fig. 5 this mode of securing the handles is shown. The ends of said handles are beveled off at a slight angle, so that the faces shall fit closely together when the handles are in position. The bevel faces are grooved for the purpose of allowing a space for the pin to enter. The handles extend back and upward, so as to be convenient for the operator to push forward the machine and to regulate the depth of the hinder teeth.

The machine above described is intended for garden weeding and cultivation by hand, and should be of a size corresponding to the width of the rows in which the crop is planted; and the above arrangement enables the machine to pass centrally over the rows of plants, and a space is left between the two front teeth wide enough to leave the plants undisturbed, and the machine should be wide enough to cut all the weeds to the middle of the space between the rows.

Having now fully described my improvement, what I claim as my invention, and desire to secure by Letters Patent, is—

The arrangement of the loop at the juncture of the cross and side bars, in combination with the binding-pin and the double-looped yoke extending transversely from one side bar to the other for holding the handles in the manner and for the purposes specified.

In testimony whereof I have signed my name to this specification before two subscribing witnesses.

WM. ADAMS.

Witnesses:
HENRY C. KNIGHT,
RICHARD SHIPMAN.